Dec. 8, 1936.  C. L. FRANKLIN  2,063,598
SPARE WHEEL MOUNT
Filed March 25, 1936  2 Sheets-Sheet 1

WITNESSES
Edw. Thorpe
Geo. Poster

INVENTOR
Charles L. Franklin
BY
Munn, Anderson & Liddy
ATTORNEYS

Dec. 8, 1936.

C. L. FRANKLIN 2,063,598

SPARE WHEEL MOUNT

Filed March 25, 1936

WITNESSES
Edw. Thorpe
A. W. Foster

INVENTOR
Charles L. Franklin
BY
Munn, Anderson & Liddy
ATTORNEYS

Patented Dec. 8, 1936

2,063,598

UNITED STATES PATENT OFFICE 2,063,598

SPARE WHEEL MOUNT

Charles L. Franklin, Brooklyn, N. Y.

Application March 25, 1936, Serial No. 70,728

1 Claim. (Cl. 296—37)

This invention relates to spare wheel mounts, an object of the invention being to provide an improved mount for the spare wheel which can be moved into a compartment to receive the wheel and the mount and which also can be moved or swung out of the compartment and with one end of the frame resting on the ground so that wheels may be rolled out of or into the frame without bodily lifting the wheel.

It is a well-known fact that changing wheels and the lifting of spares into compartments or on to supports, is a dirty job as it is ordinarily necessary to grasp the sides of the tire which are dirty and bodily lift the wheel. My invention obviates this necessity and therefore makes the work of changing wheels a much cleaner one than heretofore.

A further object is to provide an automobile with an improved arrangement of compartments and wheel mounts, all of which will be more fully hereinafter described and pointed out in the claim.

In the accompanying drawings—

Figure 1:
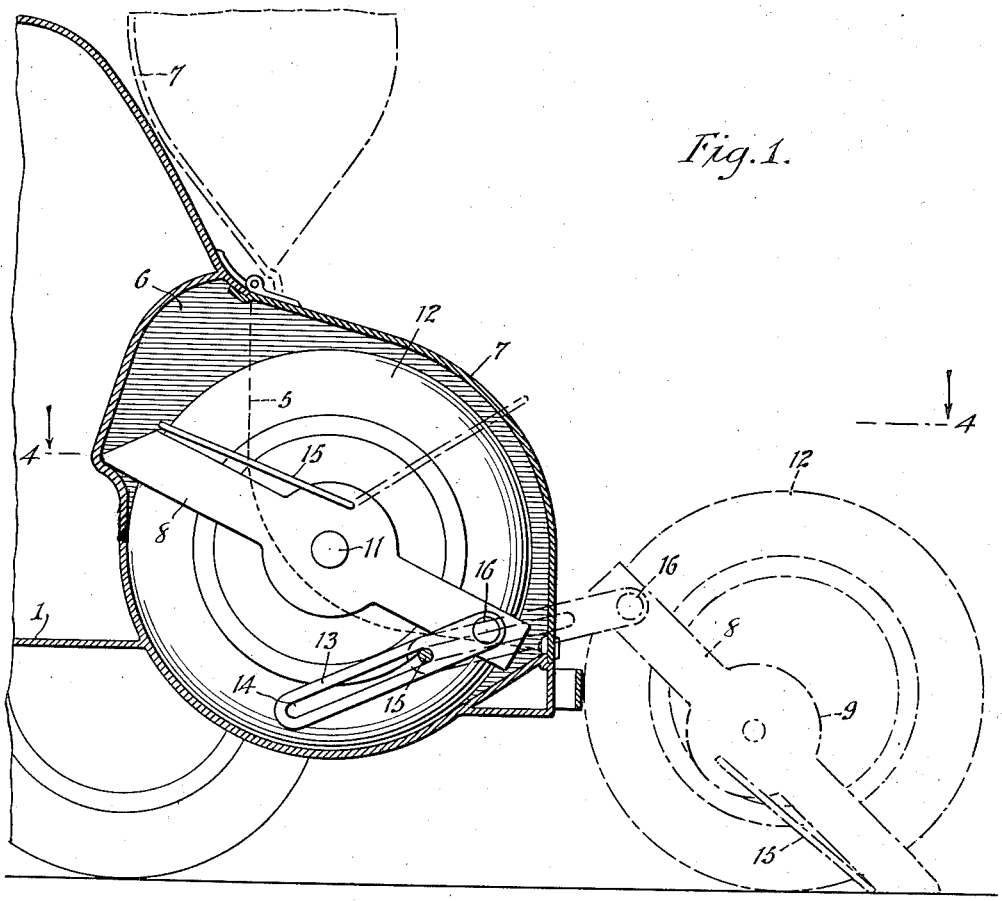
Figure 1 is a view in vertical longitudinal section through a wheel compartment constituting the rear end of an automobile body, showing in full lines the wheel and its mount in the compartment and in dot-and-dash lines the wheel and mount drawn rearwardly out of the compartment and resting on the ground.
Figure 2:
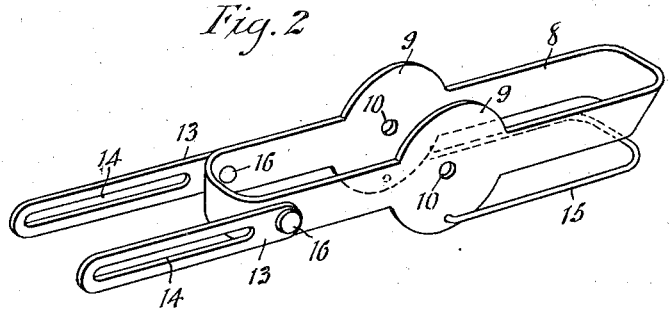
Fig. 2 is a perspective view of the wheel mount.
Figure 3:
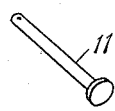
Fig. 3 is a perspective view of a removable pin which may be utilized to extend through the wheel mount and hub of the wheel to couple the parts together.
Figure 4:
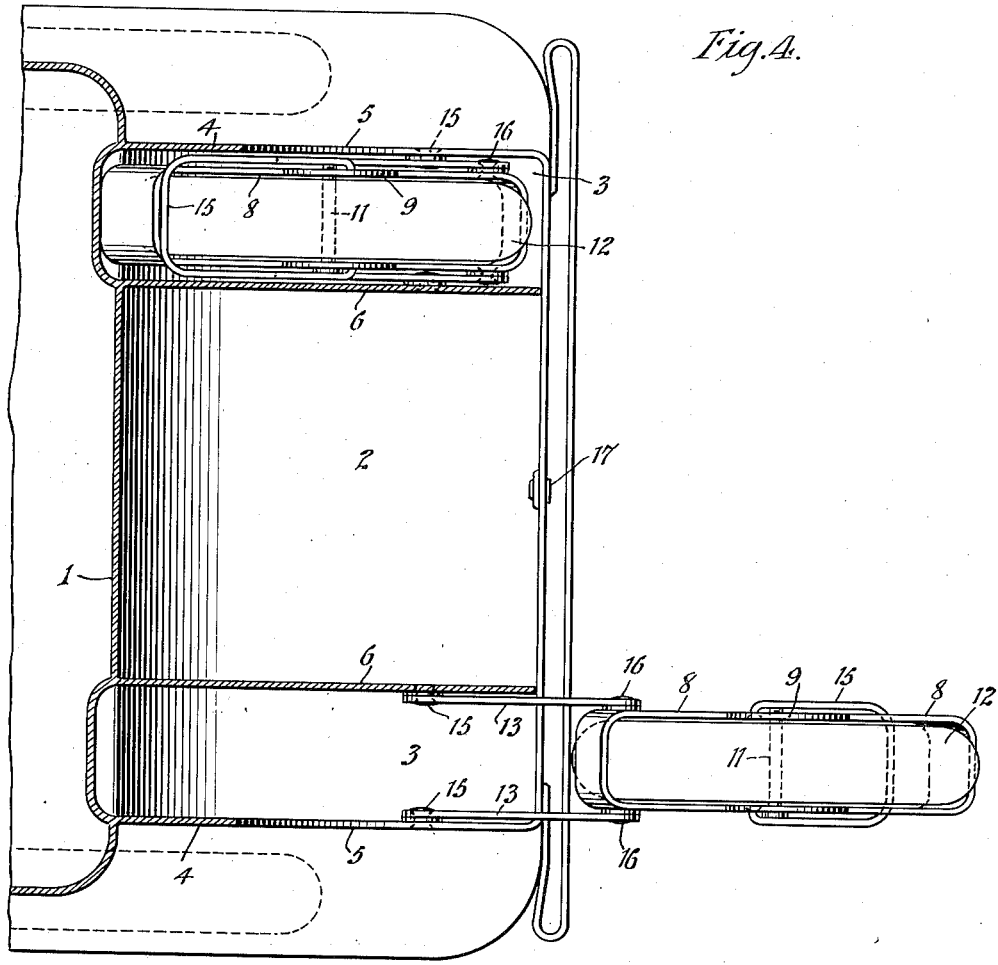
Fig. 4 is a sectional plan view on the line 4—4 of Fig. 1 with the cover of the several compartments removed, one wheel mount being shown in its compartment and the other out of its compartment.

1 represents the body of an automobile having at its rear end a central baggage compartment 2 and spare wheel compartments 3 at the ends thereof. The outer walls 4 of the compartments 3 are cut away or shaped as indicated by the dotted line 5 in Fig. 1, but the inner walls 6 of these compartments are not so cut away so that when a hinged cover 7 is swung downwardly over the compartments in closed position the compartments 2 and 3 will be completely separated and the baggage compartment 2 will be protected from dust and dirt which may collect in the wheel compartments 3. It is, of course, understood that the cover 7 at its ends is shaped to correspond with the shape of the upper edges of the end walls 4 so as to completely close the wheel compartments. Any suitable form of lock 17 may be employed to secure the cover in fixed position and prevent theft of the articles in the compartments.

In each wheel compartment I locate my improved wheel mounts and as these wheel mounts are precisely alike in construction the description hereinafter of one will apply alike to both. Each wheel mount includes a wheel-receiving frame 8 comprising connected parallel spaced bars preferably enlarged at their central portions, as shown at 9, and having alined openings 10 in said enlarged portions 9 to receive a coupling pin 11 which is passed through the hub of the wheel 12 to removably couple the wheel in the frame. One end of this frame 8 is connected by pivots 16 to a pair of links 13, and these links 13 have longitudinal slots 14 therein which receive pins 15 in the walls of the wheel compartments to couple the links to the walls. A bail 15 is pivotally connected at one end to the enlargements 10 and functions to assist the movement of the frame and wheel as will now be explained.

Fig. 1 shows in full lines the position of the wheel and its mount in a compartment. When it is desired to remove the wheel the operator lifts the cover 7 and grasps the bail 15 and by exerting a pull on this bail the frame 8 is caused to swing on its pivots 16 moving out of the compartment, and as the wheel and mount are free from the compartment they will move downwardly and rest upon the ground. This additional movement is permitted by the slots 14 in the links 13. When the coupling pin 11 is removed from the frame 8 the frame will fall or drop to the position shown in dot-and-dash lines in Fig. 1, that is, the rear end of this frame will rest upon the ground so that the wheel may be rolled out of the frame and along the ground to the axle and the wheel which has been removed can be rolled back over the ground and into the frame and then coupled therein by the pin, and by swinging this frame 8 upwardly and inwardly the wheel will be caused to move easily into the compartment. Thus it is not necessary for the operator to grasp the tire of the wheel and bodily lift the same, and the operation of changing the wheel is therefore made much cleaner than was heretofore possible.

While I have illustrated and described what I believe to be the preferred embodiment of my invention, it is obvious that various slight changes may be made with regard to the form and arrangement of parts without departing from my invention, and hence I do not limit myself to the precise details set forth but consider myself at liberty to make such changes and alterations as fairly fall within the spirit and scope of the claim.

I claim:

The combination with an automobile having a wheel compartment, of a wheel-receiving frame adapted to be swung into and out of said compartment, and comprising a pair of parallel bars connected at their ends by shorter bars and spaced apart a distance sufficient to receive a wheel between them, one of the shorter bars disposed at an angle which permits the same to rest flat on the ground and allow a wheel to be easily rolled over the same into or out of the frame, means intermediate the ends of the frame to engage a wheel hub and couple the wheel to the frame, and links pivotally connecting the frame to the automobile and which permit the wheel frame to be turned over to deposit a wheel in the compartment or remove the wheel therefrom.

CHARLES L. FRANKLIN.